US010865008B2

(12) United States Patent
Katsuta et al.

(10) Patent No.: US 10,865,008 B2
(45) Date of Patent: Dec. 15, 2020

(54) SYNTHETIC RESIN CONTAINER

(71) Applicant: TOYO SEIKAN CO., LTD., Tokyo (JP)

(72) Inventors: Hidehiko Katsuta, Yokohama (JP); Hiroki Yasukawa, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 48 days.

(21) Appl. No.: 16/312,021

(22) PCT Filed: Jun. 28, 2017

(86) PCT No.: PCT/JP2017/023798
§ 371 (c)(1),
(2) Date: Dec. 20, 2018

(87) PCT Pub. No.: WO2018/008494
PCT Pub. Date: Jan. 11, 2018

(65) Prior Publication Data
US 2019/0161230 A1 May 30, 2019

(30) Foreign Application Priority Data
Jul. 8, 2016 (JP) ................. 2016-135886

(51) Int. Cl.
B65D 1/02 (2006.01)
B29C 49/06 (2006.01)
(Continued)

(52) U.S. Cl.
CPC ............ *B65D 1/0223* (2013.01); *B29C 49/06* (2013.01); *B65D 1/02* (2013.01); *B65D 23/102* (2013.01);
(Continued)

(58) Field of Classification Search
CPC ............... B65D 1/0223; B65D 79/005; B65D 2501/0036; B65D 2501/0081; B65D 1/02; B65D 23/102
See application file for complete search history.

(56) References Cited

U.S. PATENT DOCUMENTS

2017/0283108 A1* 10/2017 Lane .................... B65D 1/0223

FOREIGN PATENT DOCUMENTS

EP 2 517 967 A1 10/2012
JP 10-264917 A 10/1998
(Continued)

OTHER PUBLICATIONS

Communication dated Feb. 19, 2020 from European Patent Office in EP Application No. 17824099.0.
(Continued)

*Primary Examiner* — Don M Anderson
(74) *Attorney, Agent, or Firm* — Sughrue Mion, PLLC

(57) ABSTRACT

A synthetic resin container, including a mouth portion, a shoulder portion, a body portion and a bottom portion. The body portion is formed into an angular cylindrical shape and has one or more concave groove portions formed along a circumferential direction such that: a cross section shape of a site in which the concave groove portion is formed is similar to a cross section shape of a site formed into the body portion, and when the cross section shape of the site in which the concave groove portion is formed and the cross section shape of the site formed into the angular cylindrical shape of the body portion are superimposed, respective apexes of the cross section shape of the site in which the concave groove portion is formed internally contact respective sides of the cross section shape of the site formed into the angular cylindrical shape of the body portion.

6 Claims, 7 Drawing Sheets

(51) Int. Cl.
  *B65D 23/10* (2006.01)
  *B65D 79/00* (2006.01)
(52) U.S. Cl.
  CPC .... *B65D 79/005* (2013.01); *B65D 2501/0036* (2013.01); *B65D 2501/0081* (2013.01)

(56) References Cited

FOREIGN PATENT DOCUMENTS

| | | |
|---|---|---|
| JP | 2008-007147 A | 1/2008 |
| JP | 2011-116428 A | 6/2011 |
| JP | 2011-136705 A | 7/2011 |
| WO | 99/08945 A1 | 2/1999 |
| WO | 2011/090659 A1 | 7/2011 |

OTHER PUBLICATIONS

International Search Report, dated Sep. 5, 2017 from the International Bureau in counterpart International application No. PCT/JP2017/023798.

International Preliminary Report on Patentability and Translation of Written Opinion, dated Jan. 17, 2019 from the International Bureau in counterpart International application No. PCT/JP2017/023798.

* cited by examiner

SYNTHETIC RESIN CONTAINER

CROSS REFERENCE TO RELATED APPLICATIONS

This application is a National Stage of International Application No. PCT/JP2017/023798 filed Jun. 28, 2017, claiming priority based on Japanese Patent Application No. 2016-135886 filed Jul. 8, 2016.

TECHNICAL FIELD

The present invention relates to a synthetic resin container, which can be used for carbonated drinks, etc., in which, after the container is filled with contents and hermetically sealed, a positive pressure takes place inside the container.

BACKGROUND ART

Conventionally, containers made from synthetic resin, which are manufactured by forming a closed-end cylindrical preform by using thermoplastic resin such as polyethylene terephthalate and then molding this preform into a bottle by biaxial stretch blow molding, have been generally used in wide fields as the containers whose contents are various drinks and various flavorings, etc.

The containers of this kind made from synthetic resin are mainly classified into those having an angular cylindrical container shape called angular bottle and those having a round cylindrical shape called round bottle. However, the applicable container shapes have been limited depending on their uses. For example, in the containers used for carbonated beverages, after the container filled with the contents is hermetically sealed, the positive pressure takes place inside the container due to carbon dioxide, and therefore the shape of the container is generally round cylindrical, so that the pressure is equally distributed, thereby preventing the shape from being deformed remarkably unevenly (see for example Patent Document 1).

Meanwhile, the angular bottle having the angular cylindrical container shape is advantageous in storage efficiency when packed in a box for transportation and in space efficiency when displayed in a store front. Therefore, for example, in Patent Document 2, attempts have been made to restrict swelling of the container body portion caused by inner pressure by forming annular reinforcing ribs in a container body portion formed into the-angular cylindrical shape, so that the angular bottle can be utilized for the carbonated drinks.

PRIOR ART DOCUMENTS

Patent Documents

Patent Document 1: JP Patent Appl. Publ. No. H10-264917
Patent Document 2: JP Patent Appl. Publ. No. 2008-7147

SUMMARY OF THE INVENTION

Problem to be Solved by the Invention

However, it has been impossible to sufficiently restrict the swelling of the container body portion caused by the inner pressure by merely forming the annular reinforcing rib as in Patent Document 2.

Generally, after the container filled with the contents is hermetically sealed, a label indicating the contents is wound around the container body portion and is to be on the market. Thus, if the swelling of the container body portion due to the inner pressure cannot be sufficiently restricted, there is a problem in that it is difficult to store the containers into a carton and the labels may be damaged by rubbing against each other due to vibrations during transportation.

Further, under recent circumstances where the synthetic resin containers of this kind have been utilized more generally in the wide field, it has been demanded to enhance a product appeal by differentiating the containers from other products. If the angular cylindrical container shape can be applied to the container containing the carbonated drinks as the contents, for which container the applicable container shape has been conventionally limited, the product appeal can be enhanced by variation of the designs.

With the above-described circumstances taken into consideration, the present invention is conceived and its object is to provide the synthetic resin containers, which can sufficiently restrict the swelling of the container body portion due to the inner pressure, while having the angular cylindrical container shape.

Means for Solving the Problem

The synthetic resin container according to the present invention comprises a mouth portion, a shoulder portion, a body portion and a bottom portion, and as well as is configured in such a manner that:

the body portion is formed into an angular cylindrical shape having a polygonal cross section shape and has one or more concave groove portions formed along a circumferential direction; and the concave groove portions being formed in such a manner that:

a cross section shape of a site in which the concave groove portion is formed is similar to a cross section shape of a site formed into the angular cylindrical shape of the body portion, and when the cross section shape of the site in which the concave groove portion is formed and the cross section shape of the site formed into the angular cylindrical shape of the body portion are superimposed on each other on the same plane, respective apexes of the cross section shape of the site in which the concave groove portion is formed internally contact with respective sides of the cross section shape of the site formed into the angular cylindrical shape of the body portion.

Effect of the Invention

According to the present invention, the synthetic resin container having the angular cylindrical shape is provided, in which, when the positive pressure takes place inside the container after the container filled with the contents is hermetically sealed, the deformation due to the swelling of the body portion can be effectively restricted.

EMBODIMENTS FOR CARRYING OUT THE INVENTION

Figure 1:
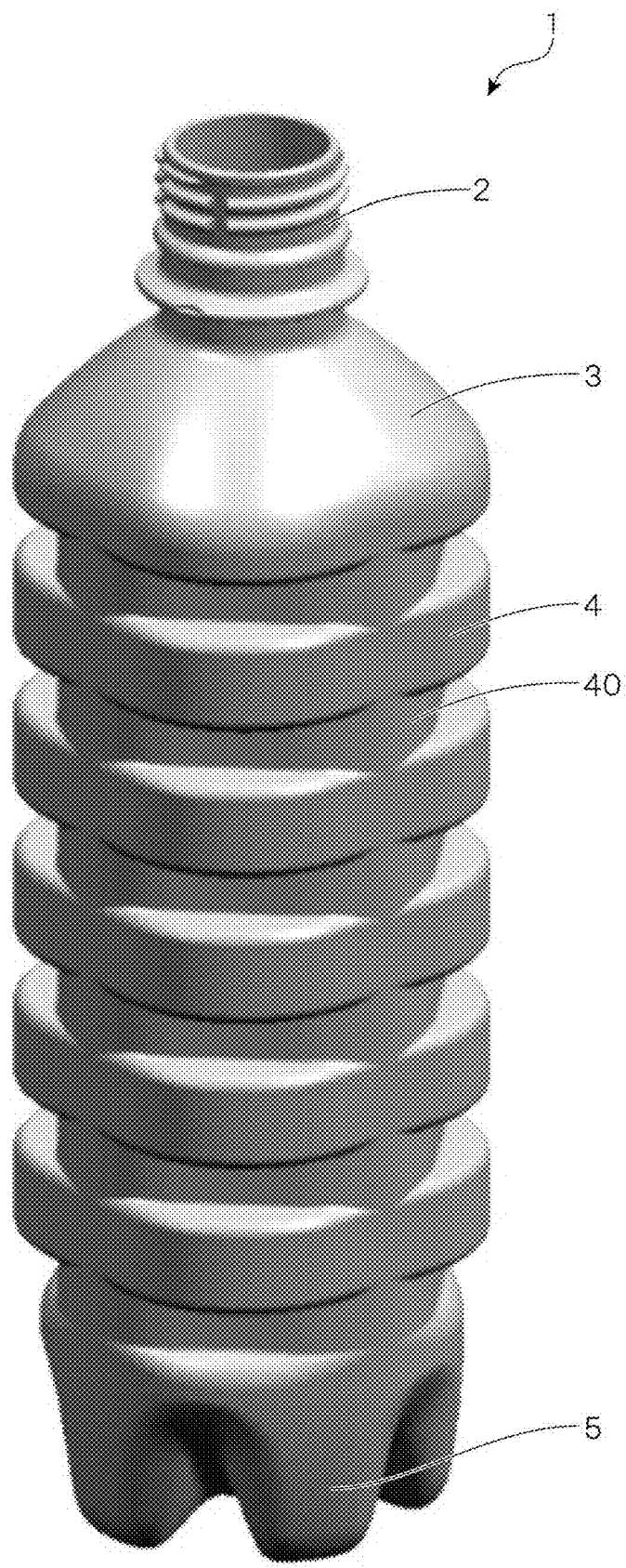
FIG. 1 is a perspective view showing an outline of an embodiment of the synthetic resin container according to the present invention.

Hereinafter, preferable embodiments of the present invention will be explained by referring to the drawings.

Figure 2:
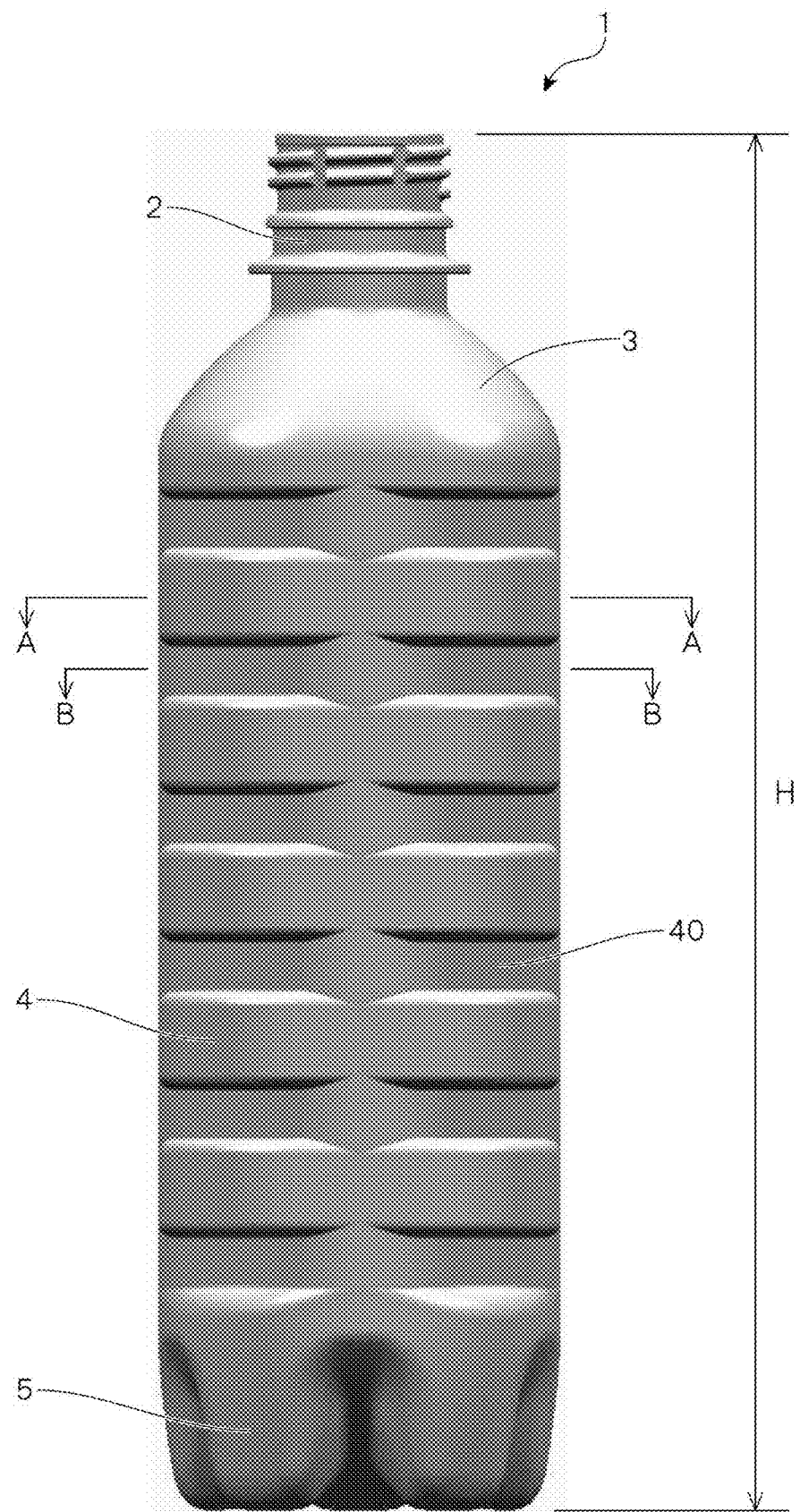
FIG. 2 is a front view showing an outline of an embodiment of the synthetic resin container according to the present invention.

As one embodiment of the synthetic resin container according to the present invention, its perspective view is shown in FIG. 1 and its front view is shown in FIG. 2.

Figure 3:
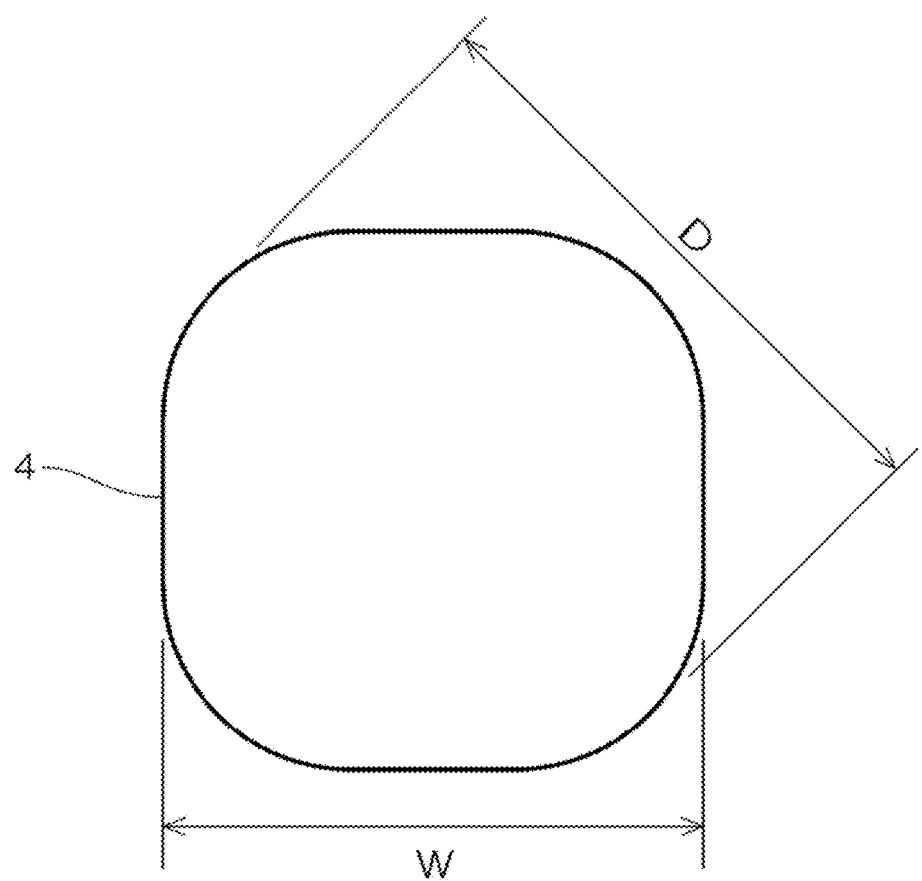
FIG. 3 is an end face drawing along A-A in FIG. 2.
Figure 4:
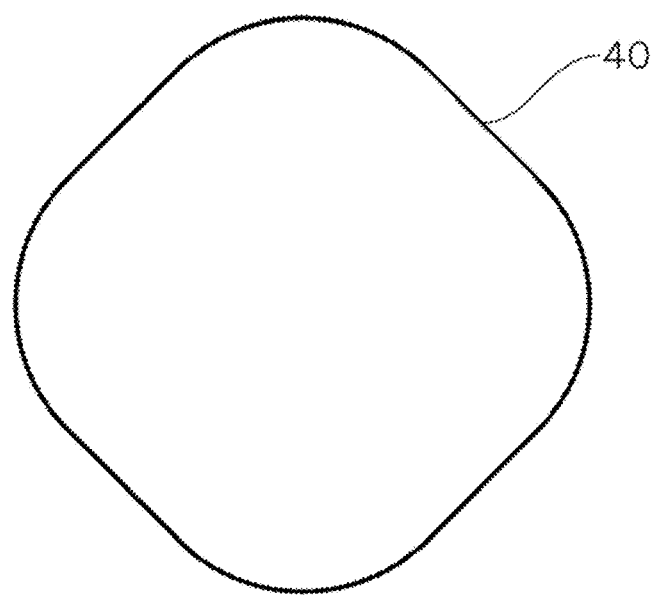
FIG. 4 is an end face drawing along B-B in FIG. 2.

Further, an end face appearing on a section as a result of cutting the container 1 along a horizontal face containing the A-A line in FIG. 2 is shown in FIG. 3, and an end face appearing on a section as a result of cutting the container 1 along a horizontal face containing the B-B line in FIG. 2 is shown in FIG. 4.

In these end face drawings, the thickness of the container 1 is omitted.

The container 1 comprises the mouth portion 2, the shoulder portion 3, the body portion 4 and the bottom portion 5. The container 1 shown as one embodiment of the present invention has a container shape having the body portion 4 formed into the angular cylindrical shape, which is generally called angular bottle.

The above-described container 1 is manufactured by molding a closed-end-cylindrical preform by using thermoplastic resin by means of injection molding or compression molding and molding this preform into a predetermined container shape by means of biaxial stretch blow molding, etc.

When the container 1 is manufactured, any resin, which can be blow-molded, can be used as thermoplastic resin to be used. Concretely, thermoplastic polyesters such as polyethylene terephthalate, polybutylene terephthalate, polyethylene naphthalate, acrylate polymer and polylactic acid or copolymers of these substances, the resin blended some resins of these substances, or the resin blended some resins of these substances with other resins are suitable. Particularly, ethylene-terephthalate-based thermoplastic polyesters such as polyethylene terephthalate are suitably used. Polycarbonate, acrylonitrile resin, polypropylene, propylene-ethylene copolymers and polyethylene, etc. can also be used.

The mouth portion 2 is a cylindrical site as an output port for the contents, and a non-illustrated lid member for hermetically sealing the container is attached to the mouth portion 2.

Further, a lower end of the mouth portion 2 has its diameter expanded toward the body portion 4 and is connected to the shoulder portion 3, which communicates the mouth portion 2 with the body portion 4. In the illustrated example, the shoulder portion 3 is formed to have a truncated pyramid shape.

The body portion 4 is a site that occupies the most part of the height direction of the container 1. An upper end of the body portion 4 is connected to the shoulder portion 3 and a lower end thereof is connected to the bottom portion 5. In the illustrated example, the bottom portion 5 has a shape that is generally called petaloid shape in order to prevent self-standing stability from being lowered even under the positive pressure inside the container. Meanwhile, if the container 1 can stand by itself even after being filled with the contents and hermetically sealed, the shape of the bottom portion 5 is not particularly limited.

It is assumed that the height direction means a direction orthogonal to a horizontal face when the container 1 is erected on the horizontal face with the mouth portion 2 upward, and the upper, lower, left, right, vertical and lateral directions of the container 1 are defined in this state.

In the present embodiment, the cross section shape (the shape of the section orthogonal to the height direction) of the body portion 4 is square, and the body portion 4 is formed into the angular cylindrical shape having its corners round-chamfered.

The body portion 4 also has a concave groove portion 40 formed along its circumferential direction and, in the illustrated example, the six concave groove portions 40 are disposed parallel at equal intervals along the height direction.

Figure 5:
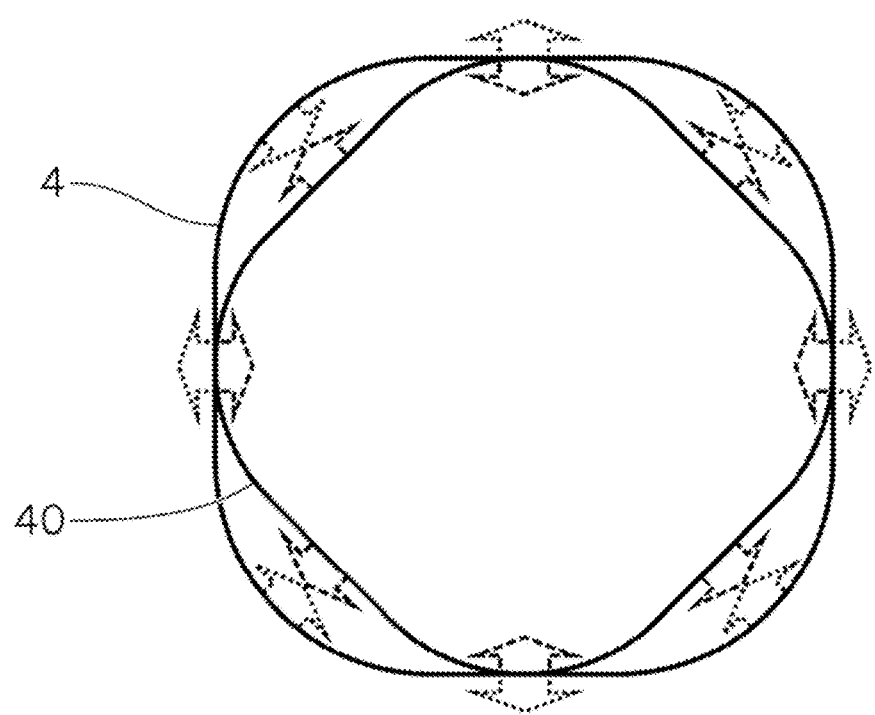
FIG. 5 is an explanative drawing, in which the end face drawing along A-A in FIG. 2 and the end face drawing along B-B in FIG. 2 are superimposed on each other on the same plane.

FIG. 5 shows a state that the cross section shape (see FIG. 3) of the site formed into the angular cylindrical shape of the body portion 4 of the container 1 in the present embodiment and the cross section shape (see FIG. 4) of the site in which the concave groove portion 40 is formed are superimposed on each other. As shown in FIG. 5, in the present embodiment, the concave groove portion 40 formed in the body portion 4 is formed in such a manner that the cross section shape of the site in which the concave groove portion 40 is formed is similar to the cross section shape of the site formed into the angular cylindrical shape of the body portion 4.

It is assumed that the term "similar" means not only mathematical "similar" in the narrow sense, but the shapes being similar to each other. Thus, the cross section shape of the site in which the concave groove portion 40 is formed, has only to be similar to the cross section shape of the site of the body portion 4 formed into the angular cylindrical shape, so that these shapes can be recognized to have similar polygonal shapes with the same number of sides and the same number of apexes.

In the present embodiment, since the cross section shape of the site of the body portion 4 formed into the angular cylindrical shape is the square, the concave groove portion 40 is formed in such a manner that the cross section shape of the site, in which the concave groove portion 40 is formed, is also the square shape.

Further, when the concave groove portion 40 is formed, in addition to the above-described matter, the concave groove portion 40 is formed in such a manner that, when the cross section shape of the site, in which the concave groove portion 40 is formed, and the cross section shape of the site formed into the angular cylindrical shape of the body portion 4 are superimposed on each other on the same plane, the respective apexes of the cross section shape of the site, in which the concave groove portion 40 is formed, internally contact with the respective sides of the cross section shape of the site formed into the angular cylindrical shape of the body portion 4 (see FIG. 5).

The thus formed concave groove portion 40 is recessed to cross the respective corners of the body portion 4 and has groove bottom sections extending in a direction orthogonal to the height direction. Then, the above groove bottom sections are arranged to have square shapes with their apexes formed on the side faces of the body portion 4.

In the examples shown in FIGS. 1 to 5, the cross section shape of the site in which the concave groove portion 40 is formed, has a relationship in the narrow sense of mathematical similar (reduction similar) with respect to the cross section shape of the site of the body portion 4 formed into the angular cylindrical shape. The apexes of the concave groove portion 40 is positioned at the centers of the side faces of the body portion 4 in the lateral width direction and are round-chamfered (R-chamfered with the curvature radius reduced) like the corners of the site formed into the angular cylindrical shape of the body portion 4. The groove bottom sections of the concave groove portion 40 is also formed planar in such a manner that the respective sides of the cross section shape of the site, in which the concave groove portion 40 is formed, are linear.

According to the present embodiment, the above-described concave groove portions 40 are formed in the body portion 4 of the container 1 having the angular cylindrical container shape, so that the deformation due to the swelling of the body portion 4 can be effectively restricted even when the positive pressure takes place inside the container. The reason therefor will be explained based on comparison with the prior art.

Figure 8:
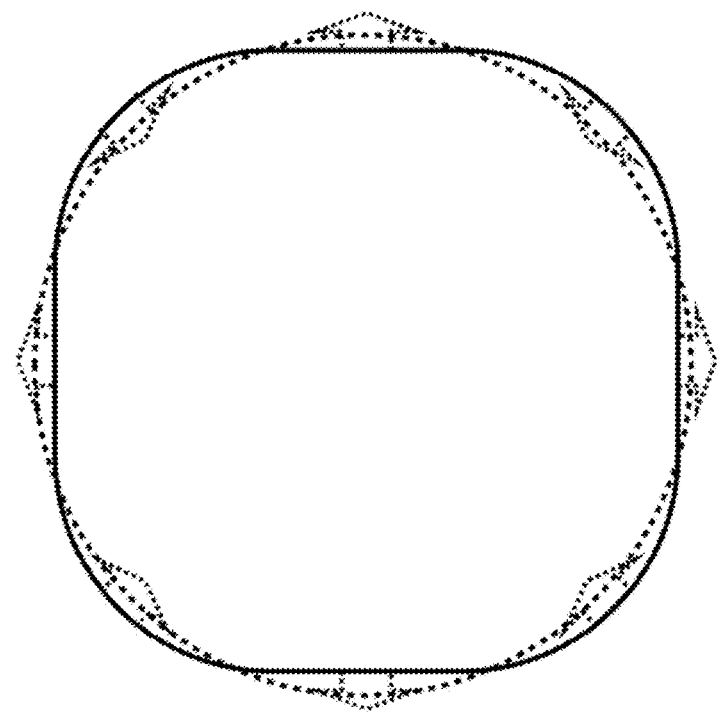
FIG. 8 is an explanative drawing showing a cross section shape of the container body portion in a prior art.

In the angular bottle that the cross section shape of the body portion is square, when the positive pressure takes place inside the container, as shown in FIG. 8, a force causing to deform so that the container is swelled outward from the container acts on the side faces of the body portion and, simultaneously, a force causing to deform so that the corners are drawn inward in to the container acts on the corners of the body portion. As a result, the angular bottle is deformed so that the cross section shape of the body portion to be circular due to the actions of these forces.

Further, as in Patent Document 2, when the annular reinforcing rib is formed in the body portion of the angular bottle that the cross section shape thereof is square, the cross section shape of the site in which the annular reinforcing rib is formed is circular. Therefore, when the positive pressure takes place inside the container, in the site which the annular reinforcing rib is formed, the inner pressure (force) acts equally on the whole reinforcing rib, and thereby, it is difficult to swell outward from the container. Meanwhile, in the body portion that the cross section shape is square, when the inner pressure (force) causing to deform so that the container is swelled outward from the container acts on the container, the side faces easily swell to be deformed and the corners are deformed so as to draw inward into the container. Therefore, the angular shape of the body portion of the angular bottle cannot be maintained (see FIG. 9).

Meanwhile, in the present embodiment, when the positive pressure takes place inside the container, force causing to deform so that the container is swelled outward acts on the groove bottom section of the site in which the concave groove portion 40 is formed and, simultaneously, the force causing to deform so that the apexes are drawn inward into the container acts on the apexes of the concave groove portion 40. Then, as FIG. 5 shows the directions of the respective forces as the arrows, the actions of these forces offset both of the force causing to deform so that the corners of the body portion 4 are drawn inward into the container and the force causing to deform so that the side faces of the body portion 4 are swelled outward. As a result, the deformation due to the swelling of the body portion 4 can be restricted.

As described above, in the present embodiment, when the positive pressure takes place inside the container, the force acting on the site of the body portion 4 formed into the angular cylindrical shape is offset by the force acting on the site in which the concave groove portion 40 is formed, so that the deformation due to the swelling of the body portion 4 is restricted.

Thus, it is sufficient that the cross section shape of the site formed into the angular cylindrical shape of the body portion 4 and the cross section shape of the site in which the concave groove portion 40 is formed are similar to be able to recognize as the similar polygonal shapes having the same number of sides and the same number of apexes as described above, so the cross section shape of the site in which the concave groove portion 40 is formed can be appropriately modified in order to be able to offset more effectively the force acting on the site of the body portion 4 formed into the angular cylindrical shape.

Figure 6:
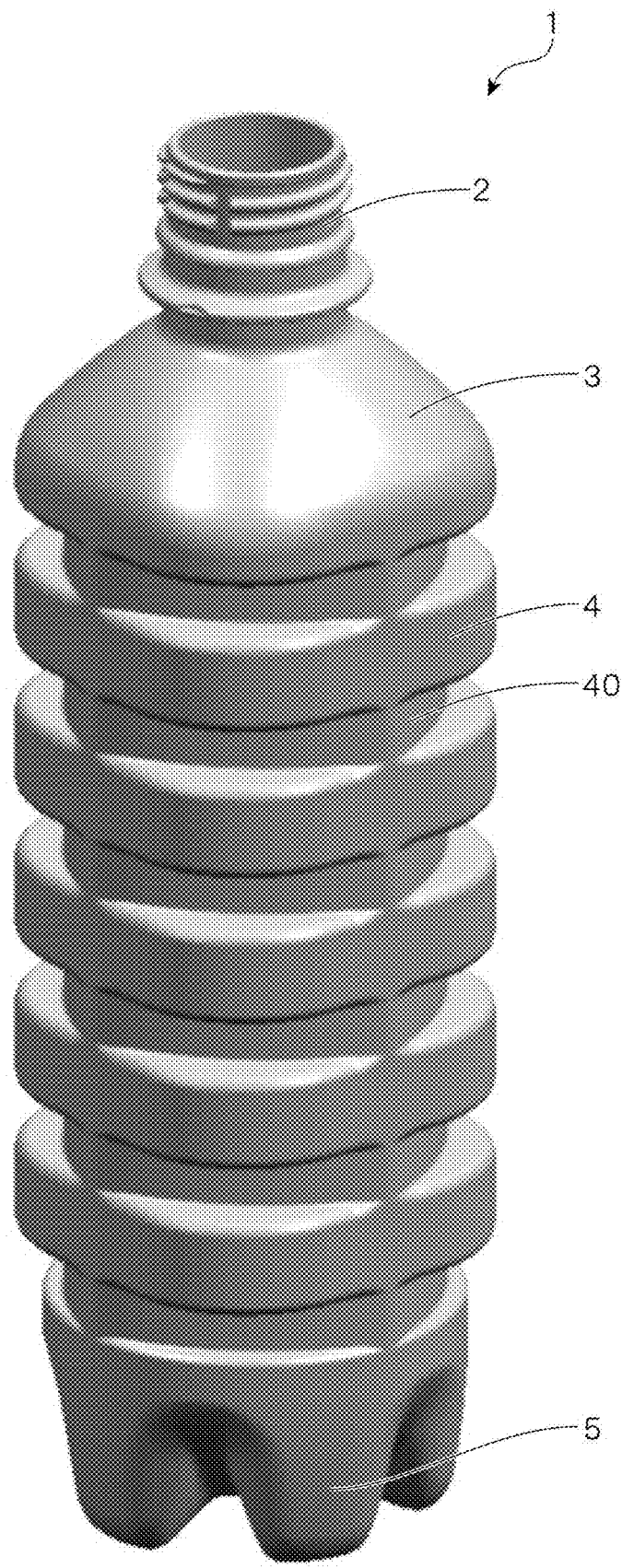
FIG. 6 is a perspective view showing an outline of a variation of an embodiment of the synthetic resin container according to the present invention.
Figure 7:
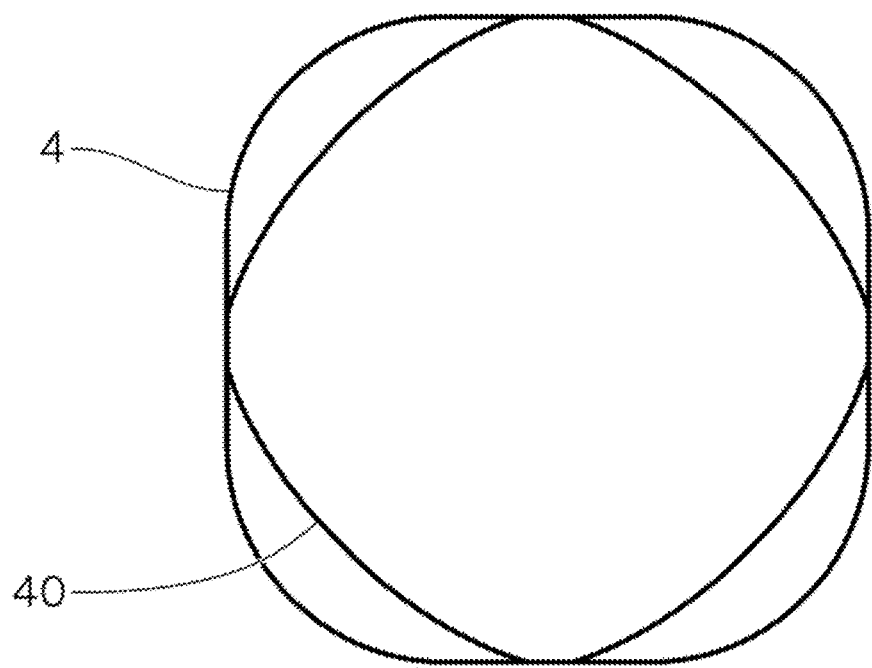
FIG. 7 is an explanative drawing showing a cross section shape of the variation of an embodiment of the synthetic resin container according to the present invention in such a manner that the cross section shape corresponds to FIG. 5.

For example, while FIGS. 6 and 7 show variations of the present embodiment, as shown in FIG. 7, the apexes of the concave groove portions 40 may be chamfered linearly to include the surfaces flush with the side faces of the body portion 4, or the groove bottom sections of the concave groove portions 40 may be curved in such a manner that the respective sides of the cross section shape at the sites in which the concave groove portions 40 are formed are arched protruding outward from the container.

FIG. 7 is an explanative drawing, which shows that, in the variation of the present embodiment shown in FIG. 6, the cross section shape of the site formed into the angular cylindrical shape of the body portion 4 of the container 1 and the cross section shape of the site in which the concave groove portion 40 is formed are superimposed on each other in correspondence to FIG. 5.

Further, though not illustrated in particular, the groove bottom sections of the concave groove portion 40 may be formed planarly so that the respective sides of the cross section shape of the site in which the concave groove portion 40 is formed are linear. Also, the apexes of the concave groove portion 40 may be formed to include the surface flush with the side faces of the body portion 4 by chamfering the apexes of the concave portions 40 in C-chamfered state or by further linearly chamfering the R-chamfered apexes, for example.

Further, it is preferable to form the concave groove portion 40 in such a manner that the apexes of the concave groove portion 40 lie at the centers in the lateral width directions of the side faces of the body portion 4, in order to offset the force causing to deform so that the side face of the body portion 4 is swelled outward from the container and to restrict the swelling of the side face of the body portion 4. However, the configuration is not limited to this case.

Further, in the illustrated example, while the similarly formed six concave groove portions 40 are arranged in parallel at equal intervals along the height direction, for example, the groove widths of the concave groove portions 40 may be made different or the intervals for the parallel arrangement may be made different depending on the positions, at which the concave groove portions 40 are formed. Moreover, the number of concave groove portions 40 is not limited and, if the deformation due to the swelling of the body portion 4 can be restricted, at least one concave groove portion 40 has only to be formed in the body portion 4.

In a word, the intervals for arranging the concave groove portions 40 in parallel, the groove widths of the concave groove portions 40 and the number of concave groove portions 40 can be appropriately changed depending on the volume or the size of the container 1, so that the deformation due to the swelling of the body portion 4 can be restricted.

EXAMPLES

Hereinafter, the present invention will be explained more in detail by referring to concrete embodiments.

Example 1

The container 1 shown in FIGS. 1 and 2 is filled with carbonated water and hermetically sealed, so that the pressure inside the container is 0.24 MPa under a condition at a temperature of 22 degrees.

The height H of the container 1 is 206 mm, the lateral width W is 60 mm, the diagonal width D is 67 mm, and the ratio (D/W) of the diagonal width D to the lateral width W is 1.12 before hermetically sealing the container 1 filled with the carbonated water.

The container 1 filled with the carbonated water and hermetically sealed is made to stand still for 24 hours in a thermostatic tank at a set temperature of 22 degrees. Thereafter, the maximum lateral width W1 and the maximum diagonal width D1 of the body portion 4 of the container 1 are measured. From the measured values, the lateral width change rate [((W1−W)/W)*100%], the diagonal width change rate [((D1−D)/D)*100%] and the ratio (D1/W1) of the maximum diagonal width D1 to the maximum lateral width W1 are obtained, and they are shown in Table 1.

Example 2

The container 1 filled with the carbonated water and hermetically sealed is made to stand still for 24 hours in the thermostatic tank at the set temperature of 37 degrees. Thereafter, as in Example 1, the lateral width change rate [((W1−W)/W)*100%], the diagonal width change rate [((D1−D)/D)*100%] and the ratio (D1/W1) of the maximum diagonal width D1 to the maximum lateral width W1 are obtained. The result thereof is shown in Table 1.

Example 3

The same as in Example 1 applies except for using the container 1 shown in FIG. 6. The lateral width change rate [((W1−W)/W)*100%], the diagonal width change rate [((D1−D)/D)*100%] and the ratio (D1/W1) of the maximum diagonal width D1 to the maximum lateral width W1 are obtained after making the container 1 stand still for 24 hours in the thermostatic tank at the set temperature of 22 degrees. The result thereof is shown in Table 1.

Example 4

The same as in Example 2 applies except for using the container 1 shown in FIG. 6. The lateral width change rate [((W1−W)/W)*100%], the diagonal width change rate [((D1−D)/D)*100%] and the ratio (D1/W1) of the maximum diagonal width D1 to the maximum lateral width W1 are obtained after making the container 1 stand still for 24 hours in the thermostatic tank at the set temperature of 37 degrees. The result thereof is shown in Table 1.

The container 1 used in Examples 3 and 4 is identical to the one used in Examples 1 and 2 except for the former having the cross section shape of the sites in which the concave groove portions 40 are formed as shown in FIG. 7. The height H is 206 mm, the lateral width W is 60 mm, the diagonal width D is 67 mm and the ratio (D/W) of the diagonal width D to the lateral width W is 1.12.

Comparative Example 1

Figure 9:
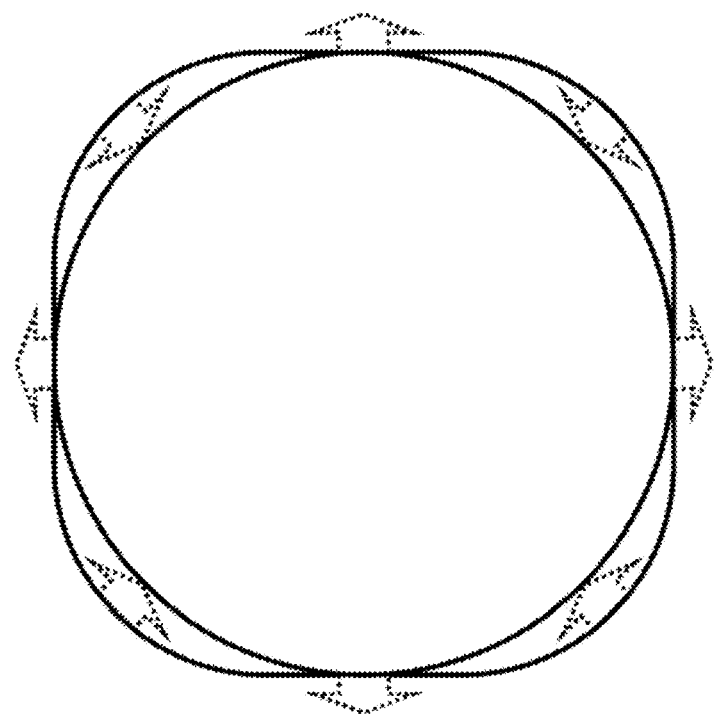
FIG. 9 is an explanative drawing showing the cross section shape of the container body portion in another prior art in such a manner that the cross section shape corresponds to FIG. 5.

The same as in Example 1 applies except for using the container, in which the annular reinforcing ribs are formed in place of the concave groove portions 40 and the cross section shape of the sites in which the reinforcing ribs are formed is circular as shown in FIG. 9. The lateral width change rate [((W1−W)/W)*100%], the diagonal width change rate [((D1−D)/D)*100%] and the ratio (D1/W1) of the maximum diagonal width D1 to the maximum lateral width W1 each of the container are obtained after making the container stand still for 24 hours in the thermostatic tank at the set temperature of 22 degrees. The result thereof is shown in Table 1.

Comparative Example 2

The same as in Example 2 applies except for using the container, in which the annular reinforcing ribs are formed in place of the concave groove portions 40 and the cross section shape of the sites in which the reinforcing ribs are formed is circular as shown in FIG. 9. The lateral width change rate [((W1−W)/W)*100%], the diagonal width change rate [((D1−D)/D)*100%] and the ratio (D1/W1) of the maximum diagonal width D1 to the maximum lateral width W1 each of the container are obtained after making the container stand still for 24 hours in the thermostatic tank at the set temperature of 37 degrees. The result thereof is shown in Table 1.

The container used in Comparative Examples 1 and 2 is identical to the one used in Examples 1 and 2 except for, in the former, the annular reinforcing ribs being formed in place of the concave groove portions 40 and the cross section shape of the sites in which the reinforcing ribs are formed being circular as shown in FIG. 9. The height H is 206 mm, the lateral width W is 60 mm, the diagonal width D is 67 mm and the ratio (D/W) of the diagonal width D to the lateral width W is 1.12.

TABLE 1

| | lateral width change rate [%] | Diagonal width change rate [%] | Maximum diagonal width/maximum lateral width [D1/W1] |
|---|---|---|---|
| Example 1 | 1.4 | 0.7 | 1.10 |
| Example 2 | 2.1 | 1.0 | 1.10 |
| Example 3 | 0.3 | 0.8 | 1.12 |
| Example 4 | 0.9 | 1.1 | 1.12 |
| Comparative Example 1 | 3.6 | −0.1 | 1.08 |
| Comparative Example 2 | 4.8 | −0.1 | 1.07 |

These comparisons reveal that, in Examples 1 to 4, the lateral width change rate is small when the positive pressure takes place inside the container, and no difference or a small difference is recognized between the diagonal width and the lateral width in comparison with the ratio before the container filled with the carbonated water is hermetically sealed, so that the deformation due to the swelling of the body portion 4 can be effectively restricted.

While having been explained so far by presenting the preferable embodiments of the present invention, the present invention is not limited to the above-described embodiments and it is needless to say that the present invention can be variously modified and embodied within the scope of the present invention.

For example, in the above-described embodiments, the container 1 having a body portion 4 with the cross section shape formed into the square angular cylindrical shape is illustrated and explained, while the illustrated examples merely show one embodiment of the present invention, and the body portion 4 can be formed into the angular cylindrical shape, so that the cross section shape is n-polygonal (where n is 3 to 12).

Further, it is needless to say that the present invention can be used not only for the carbonated drinks, but also, for example, for a container having nitrogen gas, etc. sealed therein in addition to its contents, in which the positive pressure takes place.

According to the present invention, when the body portion 4 is formed into the angular cylindrical shape having the polygonal cross section shape and has one or more concave groove portions 40 formed along the circumferential direction; and when the concave groove portion 40 being formed in such a manner that:

a cross section shape of a site in which the concave groove portion 40 is formed is similar to a cross section shape of a site formed into the angular cylindrical shape of the body portion 4, and when the cross section shape of the site in which the concave groove portion 40 is formed and the cross section shape of the site formed into the angular cylindrical shape of the body portion 4 are superimposed on each other on the same plane, respective apexes of the cross section shape of the site in which the concave groove portion is formed internally contact with the respective sides of the cross section shape of the site formed into the angular cylindrical shape of the body portion 4, the features in details of the present invention other than the above-mentioned ones can be appropriately modified without being limited to the above-described embodiments. It is also possible to appropriately select and combine the features in the details explained in the above-described embodiments.

The contents of the documents described in this specification and the specification under the Japanese application, on which the priority right of the present application under the Paris Convention is based, are cited herein in their entirety.

INDUSTRIAL APPLICABILITY

The synthetic resin container according to the present invention can be used for the carbonated drinks, etc., in which the positive pressure takes place inside the container after the container filled with the contents is hermetically sealed.

EXPLANATION OF THE REFERENCE NUMERALS

1 Container
2 Mouth portion
3 Shoulder portion
4 Body portion
40 Concave groove portion
5 Bottom portion

The invention claimed is:

1. A synthetic resin container, comprising a mouth portion, a shoulder portion, a body portion and a bottom portion, wherein the body portion is formed into an angular cylindrical shape having a polygonal cross section shape and has at least one concave groove portion formed along a circumferential direction; and the at least one concave groove portion being formed in such a manner that:

a cross section shape of a site in which the at least one concave groove portion is formed is similar to a cross section shape of a site formed into the angular cylindrical shape of the body portion, and when the cross section shape of the site in which the at least one concave groove portion is formed and the cross section shape of the site formed into the angular cylindrical shape of the body portion are superimposed on each other on the same plane, respective apexes of the cross section shape of the site in which the at least one concave groove portion is formed internally contact with respective sides of the cross section shape of the site formed into the angular cylindrical shape of the body portion.

2. The synthetic resin container according to claim 1, wherein the apexes of the at least one concave groove portion are located at the centers in the lateral width directions of the side faces of the body portion.

3. The synthetic resin container according to claim 1, wherein the at least one concave groove portion is formed in such a manner that the respective sides of the cross section shape of the site in which the at least one concave groove portion is formed are linear or arched to protrude outward from the container.

4. The synthetic resin container according to claim 1, wherein the apexes of the at least one concave groove portion include surfaces flush with the side faces of the body portion.

5. The synthetic resin container according to claim 1, wherein the apexes of the at least one concave groove portion are chamfered to be in an R-chamfered state, a linear state, or a C-chamfered state.

6. The synthetic resin container according to claim 1, wherein the body portion is formed into an angular cylindrical shape whose cross section shape is n-polygonal, where n is 3 to 12.

\* \* \* \* \*